United States Patent [19]

Lerjen

[11] 4,017,088
[45] Apr. 12, 1977

[54] SHAFT SEAL FOR TURBOMACHINES

[75] Inventor: Georg Lerjen, Oberrohrdorf, Switzerland

[73] Assignee: BBC Brown Boveri & Company Limited, Baden, Switzerland

[22] Filed: Dec. 22, 1975

[21] Appl. No.: 643,329

[30] Foreign Application Priority Data

Mar. 5, 1975 Switzerland .................. 2755/75

[52] U.S. Cl. .......................... 277/53; 415/170 R
[51] Int. Cl.² .................................. F16J 15/44
[58] Field of Search .............. 277/3, 27, 53–57, 277/199; 415/170 R, 172 A, 113

[56] References Cited

UNITED STATES PATENTS

| 3,594,010 | 7/1971 | Warth | 277/53 |
| 3,825,364 | 7/1974 | Sterman | 277/53 |

Primary Examiner—Robert I. Smith
Attorney, Agent, or Firm—Pierce, Scheffler & Parker

[57] ABSTRACT

A shaft seal comprises a casing having a circumferentially extending T-shaped recess surrounding the shaft and in which are located one or more adjoining rows of seal segments displaceable in the radial direction. Each seal segment includes a radially outer suspension part by which it is supported in the T-shaped recess, a radially inner seal part having axially spaced serrations confronting the surface of the shaft which, in cooperation with axially spaced seal strips on the shaft, establish a labyrinth type seal, and an intermediate part located between the radially outer and inner parts. The construction of at least the last row of segments on the low-pressure side of the seal is such that the median plane of the serrated seal part is axially offset from the median plane of the intermediate part in the direction of the high-pressure side of the seal. The median plane of the radially outward suspension part of the seal segments can also be axially offset from the median plane of the intermediate part in the direction of the low-pressure side of the seal.

2 Claims, 4 Drawing Figures

SHAFT SEAL FOR TURBOMACHINES

The present invention relates to a shaft seal.

More particularly the present invention relates to a shaft seal for a turbo-machine which conducts pressurized working medium. Such shaft seals comprise a casing having disposed therein at least one segment row which produces a pressure gradient in the discharging working medium in the axial direction of the machine. The segments of the segment row adjoin each other in the circumferential orientation in a recess provided on the inside of the casing, said segments being installed so as to be displaceable in the radial direction, and each segment comprising a suspension component which is suspended in the casing, a serrated seal part nearest to the shaft and a middle part which joins the aforementioned parts.

Shaft seals of the kind described above have been known for a long time and are used in steam turbines as stuffing boxes and in single-flow steam turbines as compensating pistons for equalizing axial thrust. In both cases the seals seal off a pressurized internal space against an external space at a pressure which differs from the pressure of the internal space. If the shaft seal is a stuffing box, it is intended to prevent the escape of steam from the turbine casing which is under positive pressure or it is intended to prevent the ingress of ambient air into the turbine casing if this is subjected to negative pressure.

A shaft seal of this kind, in this case a stuffing box for a high-pressure turbine, is described in detail in the operating instructions HTGD 90143 D by Brown Boveri. The shaft seal comprises a shaft seal casing, referred to hereinbelow as casing, the interior of which is provided with T-slots — usually several T-slots — which extend over 360° of the circumference and are constructed to accommodate the seal segments referred to hereinbelow as segments. The segments of a segment row are serially disposed in the circumferential direction within their T-slot and are arranged so that each segment is resiliently yielding in the radial direction, substantially independently of the adjacent segments, so that when touched under the action of the applied thrust it deflects radially and returns into its starting position when the thrust is relieved. This resilient yield is obtained by means of helical springs or leaf springs which are accommodated in recesses of the segments and whose action in the operating state is increased by slots at the rear sides of the segments which allow steam of higher pressure to pass to the rear side of the segments so that these are additionally thrust towards the interior. The action of the springs in many cases is insubstantial by comparison with that of the steam, so that the springs can be neglected in the calculation of the machine.

Each segment comprises a narrow middle part which is radially and slidably disposed in the narrow part of the T-slot, and two broad parts of which one will be referred to as the suspension part and the other as the serrated seal part. The end zones of the suspension part suspended in the broad part of the T-slot bear on the shoulders thereof and prevent the segment dropping out of the said T-slot. The side surfaces of the middle part and the oppositely disposed surfaces of the narrow part of the T-slot are constructed as seal surfaces which prevent the transfer of high-pressure steam to the low-pressure side of the segment. However, the shaft seal can be constructed so that the above-mentioned seal function takes place between the shoulders of the T-slot and the end zones of the suspension part bearing thereon and these end zones must be constructed as seal surfaces to this end. In the two abovementioned embodiments the sealing action of the stuffing box takes place on the seal strips which are provided on the shaft circumference and on the oppositely disposed seal serrations which are formed on the seal serration part. To ensure this sealing action, it is however necessary for the segments to be able to deflect without obstruction in the radial direction when they are touched and to return into their starting position when the applied thrust is relieved.

The segments used in known shaft seals have a crossection of approximately I-shape and they are disposed approximately symmetrically with reference to a median plane which extends perpendicularly to the shaft axis. In other words, the median plane of the middle part is also the median plane of the suspension part and of the seal serration part. These symmetrical segments which are used as standard segments in practice, have so far completely satisfied the requirements made upon them and have fulfilled their sealing function in a satisfactory manner. However, the separation pressures between the medium-pressure turbine and the low-pressure turbine and therefore the relief pressures in the stuffing boxes of turbine plants constructed in recent years have been substantially increased, namely from approximately 3 bar to above 12 bar. The permissible pressure ratios between $P_{up}$ i.e. the pressure upstream of the segments, and $P_{down}$ i.e. the pressure downstream of the segments, and therefore the application limits of the stuffing boxes with known segments were exceeded. Conventional standardized segments cannot therefore be employed for stuffing boxes under the higher pressure ratios at present in use, because they no longer function with reliability, tend to stick when being touched and are not returned by the steam pressure into their sealing position.

It is the object of the invention to avoid the disadvantages of known shaft seals and to provide a shaft seal of the initially-mentioned kind so that its sealing function is reliably ensured by means of suitably constructed segments even for the pressure ratios which occur at the present time.

According to the invention, this problem is solved in that each segment of at least one segment row is asymmetrically constructed in such a way that the seal serration part is offset through an axial distance with respect to the middle part towards the side of the higher pressure and that the casing is constructed for accommodating the asymmetrical segments.

By contrast to known shaft seals which are provided with symmetrical segments, that do not return into their starting position after being moved as the result of an unbalance or a shaft displacement, no longer completely perform their sealing function and can therefore be used only for relatively small ratios of $P_{up}$ to $P_{down}$ the important advantages of the shaft seal according to the invention with asymmetrical segments are that they have substantially higher application limits. The segments which are characterized by a relatively slight displacement of the seal serration part with respect to their middle part return into their starting position at much higher pressure ratios, in many cases even infinitely high pressure ratios, and therefore perform their sealing function in a satisfactory manner under conditions which occur in practice.

Preferred embodiments of the invention are described as follows with reference to the accompanying drawings, in which.

Identical components in the different illustrations are provided with the same reference symbols.

Figure 1:
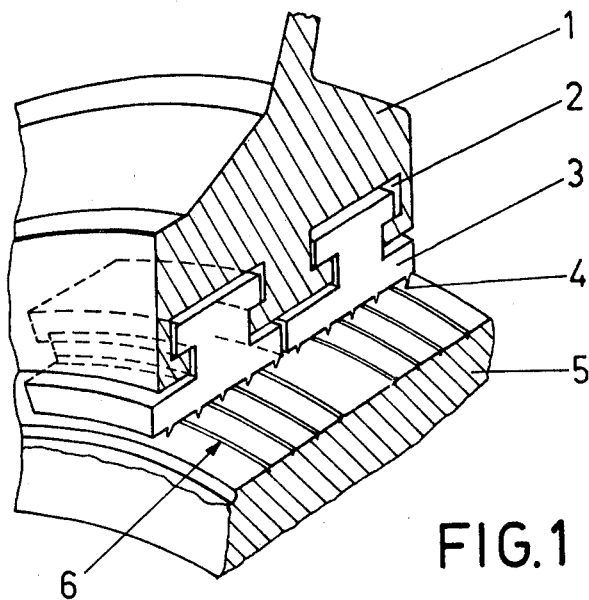
FIG. 1 shows an axial section through stuffing box which has asymmetrical segments.

The stuffing box as shown (in part) in FIG. 1 comprises a casing 1 which consists of two casing parts (not separately shown) which are bolted together. Two adjacently disposed T-slots 2, extend round the entire inner circumference of the casing 1. Asymmetrical segments 3 are arranged in serial configuration in the T-slots and are installed so that each segment is able to resiliently deflect in the radial direction, substantially independently of the adjacent segments.

Each segment 3 is provided with serrations 4 which extend close to the periphery of a shaft 5 which passes through the stuffing box. The shaft 5 is provided with staked seal strips 6 which in turn extend close to the segments 3. The serrations 4 in conjunction with the strips 6 form a labyrinth type seal, with numerous restrictions and path reversals being formed by the serrations and strips to inhibit steam flow from a high pressure to a low pressure side of the stuffing box.

The segments' serrations 4 would normally be machineturned from the solid but might alternately be staked-in. The serrations are spaced-apart by a distance A (FIG. 2), as are the corresponding seal strips 6. The said distance, also referred to as pitch, is calculated for individual stuffing boxes and is chosen to accommodate expected expansions; so that if the shaft 5 is displaced in operation with respect to its associated turbine casing, due to expansion differences, the strips 6 will finally position approximately in the middle of two serrations 4.

Figure 2:
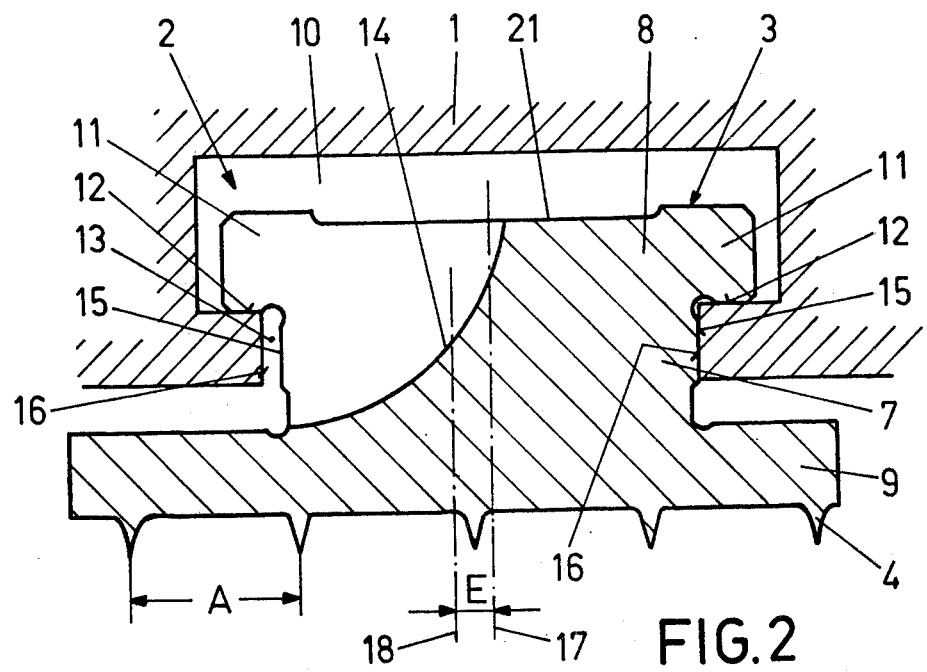
FIG. 2 shows an axial section through asymmetrical segment to an enlarged scale.

The asymmetrical segment 3 as illustrated in FIG. 2 comprises a middle part 7, a suspension part 8 and a seal serration part 9. The median plane 17 of the middle part 7 corresponds to the median plane of the suspension part 8 in the same way as in known (symmetrical) segments. However, by contrast to the known (symmetrical) segments, the median plane 18 of the seal serration part 9 of the illustrated asymmetrical segment is offset by a distance E to the left with respect to the median plane 17 of the middle part 7, — in the direction towards the high pressure side of the stuffing box. The suspension part 8 is suspended in the broad part 10 of the T-slot 2, so that the end zones 11 of the segments bear upon shoulders 12 of the T-slot 2. The middle part 7 of the segment will then be situated in the narrow part 13 of the T-slot 2 and is located therein with clearance to permit free radial displacement of the segment. A recess 14 is provided on the high-pressure side of the segment to permit steam of higher pressure to pass to the rear side 21 of the segment so that the segment is thrust towards the shaft (downwardly in the drawing). The rear side 21 of the segment is also provided with helical springs or leaf springs (not shown) which act between the segment and the casing 1 and thrust the segment against the shoulders 12 of the T-slot 2, even when the segments are not subjected to steam pressure.

The lateral surfaces 15 of the middle part 7, as well as the internal surfaces 16 of the narrow part 13 of the T-slot 2 are constructed as seal surfaces. In operation, the lateral surface 15, which is at the low pressure (right hand) side of the stuffing box, is in physical contact with the adjacently disposed internal surface 16 to form a seal which prevents the passage of high-pressure steam to the low-pressure side of the segment and thus prevents short-circuiting of the segment-shaft restrictions. This sealing action can also take place between the shoulder 12 of the T-slot 2 and the end zone 11 which bears thereon and is situated on the low-pressure side of the suspension part 8 if these parts are suitably constructed as seal surfaces.

Figure 3:
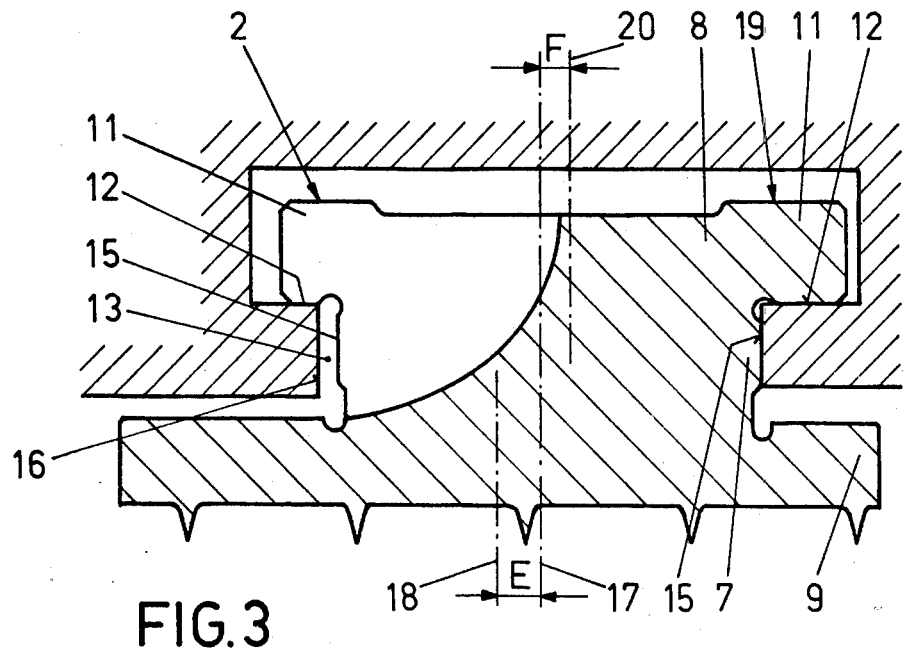
FIG. 3 shows a modification of the segment embodiment illustrated in FIG. 2.

The details of the segment 19 illustrated in FIG. 3 correspond to the details of the segment 3 illustrated in FIG. 2, with the differences being that in the segment 19 it is not only the median plane 18 of the seal serration part 9 which is offset to the left by the distance E with respect to the median plane 17 of the middle part 7 in the direction of higher pressure, but the median plane 20 of the suspension part 8 is also offset to the right by the distance F in relation to the median plane 17 of the middle part 7 in the direction of lower pressure. This additional offset is particularly advantageous if the sealing function to prevent the passage of high-pressure steam to the low-pressure side of the segment is arranged to take place not between the lateral surface 15 of the middle part 7 and the adjacently disposed internal surface 16 of the narrow part 13 of the T-slot 2, but takes place between the end zone 11 of the suspension part 8 and the shoulder 12 of the T-slot 2.

The offset in the embodiment according to FIG. 2 by the distance E and the offset according to FIG. 3 by the distances E and F can of course be obtained by displacement of the affected segment part relative to the middle part while retaining the width of the affected segment part and/or by one-sided enlargement in the desired direction of the aforementioned width.

Figure 4:
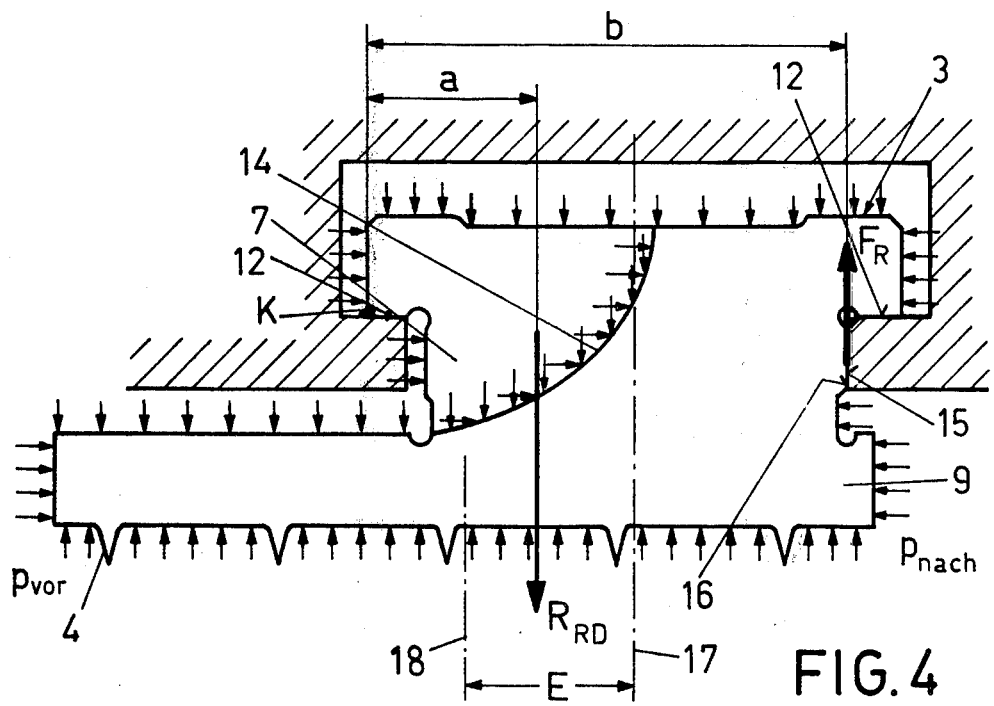
FIG. 4 is a force diagram showing the forces acting on an asymmetrical segment with parameters required for calculating application limits being indicated.

The force diagram shown in FIG. 4 shows the forces which act on the asymmetrical segment in operation and explains the method of operation of the segment. The segment designated with the reference numeral 3 is substantially identical to that according to FIG. 2 but the seal serration part 9 is shown enlarged and its median plane 18 in relation to the median plane 17 of the middle part 7 is offset by a greater distance E to the left in the direction of the higher pressure. The steam pressures which act on the segment in operation are indicated by small arrows. The steam at the pressure $P_{up}$ (i.e. the high pressure steam, at the upstream side of the seal) passes via the recess 14 on to the rear side of the segment so that a radial inwardly orientated force acts upon the segment. The steam which passes under the seal serrations 4 and over the seal strip 6 (FIG. 1) is restricted in steps so that its pressure at each restrictor position diminishes by a specific amount and drops to the value $P_{down}$ after the last restrictor position and at the downstream side of the seal. The resultants $R_{RD}$ of all radially orientated forces which act on the segment 3 must of course act downwardly in the radial direction in order to thrust the segment downwardly. This condition can be readily satisfied because the unrestricted steam on the top of the segment has a high pressure, whereas the steam pressure diminishes gradually on the underside of the segment. The illustrated offset of the seal serration part 9 by the distance E results in a enlargement of the top segment surface on which the higher pressure acts, so that the resultant $R_{RD}$ in this asymmetrically constructed segment assumes a higher value than in symmetrical segments with dimensions which are otherwise identical.

Axially orientated forces whose resultants (not shown) thrust the segment against the internal surface 16 of the narrow part 13 of the T-slot 2 also act on the segment. If the segment is contacted in operation, by the shaft, it deflects radially to the outside, the frictional force $F_R$ which is equal to the product of the axial steam force resultants and $\mu$, having to be overcome. The symbol $\mu$ refers to the frictional coefficient on the seal surface 16. If contact with the shaft, due to unbalance or shaft displacement, ceases, the segment must again overcome the frictional force $F_R$ in order to return into its starting position. If the frictional force $F_R$ is excessive, the righthand end of the segment will remain suspended in its raised position and its left-hand end will bear on the shoulder 12 at position K so that the plane of the seal serrations 4 forms a small angle with respect to the shaft, thus preventing the shaft seal from completely fulfilling its sealing function.

The moments acting about the point K (see FIG. 4) must therefore satisfy the following condition in order to ensure reliable functioning of a segment:

$$F_R \cdot b < R_{RD} \cdot a$$

Accordingly, if $F_R \cdot b \geq R_{RD} \cdot a$, the segment will no longer reliably fulfil its function. The last-mentioned relationship must therefore be regarded as a limiting condition for the usability of the segment. The segment functions reliably within this limiting condition, which can be expressed as the pressure ratio $P_{up}/P_{down}$, i.e. when being contacted it moves resiliently away from the shaft and subsequently returns into its starting position. The heat generated due to contact can be confined to permissible limits and deformation of the affected parts can be avoided. Contact therefore proceeds without detriment even under the high-pressure conditions at present in use and the behaviour of the turbine is not noticeably altered.

The advantages of the shaft seal according to the invention mentioned initially substantially comprise an extension of the application limits and a substantial increase of the pressure ratios $P_{up}/P_{down}$ which can be managed. Calculations clearly show that displacement of the seal serration part by a few millimeters relative to the middle part in segments which otherwise have identical dimensions results in substantial increases of the permissible pressure ratios $P_{up}/P_{down}$.

It should also be mentioned that the last row of segments which is disposed on the low-pressure side is the critical row and that the segments of the remaining segment rows need not necessarily be asymmetrical. Instead, the first segment rows in most cases can be provided with symmetrical segments and it is sufficient to provide only the last segment rows with asymmetrical segments. However, for practical reasons all segment rows are often provided with asymmetrical segments.

In practice, the design details of a shaft seal are defined in accordance with the requirements which are particular to the appropriate sealing problem and the segments are calculated in terms of the pressure ratio $P_{up}/P_{down}$ which is to be overcome, so that this ratio remains within permissible limits. The segments can also be calculated and tabulated in the form of standardized segments and can be made available in this form to simplify the design work of the designer.

I claim:

1. A shaft and seal structure therefor comprising a casing surrounding the shaft and having a circumferentially extending T-shaped slot opening in the direction of the shaft and which receives a pressurized gaseous medium, at least one row of circumferentially extending assymetrical seal segments located in said T-shaped slot, each said seal segment having a radially outer suspension part located in the radially outer broad part of said T-shaped slot and including end portions which overlie and bear upon correspondingly located shouldered portions of said T-shaped slot to form bearing surfaces therebetween, a radially inner serrated seal part engaging the periphery of said shaft forming a labyrinth type seal therebetween, and a middle part having lateral surfaces — one of which is located on the low-pressure side of the middle part and engages a correspondingly located internal surface at the radially inner narrow part of said T-shaped slot to form sealing surfaces therebetween, said pressurized gaseous medium serving to apply a radially inward directed force against the periphery of said seal segments, and the median plane of said radially inner serrated seal part of the seal segments of at least the last row of the low pressure side of the seal being axially offset with respect to the median plane of the middle part thereof in the direction of the high-pressure side of the seal.

2. A shaft seal as defined in claim 1 wherein the median plane of said radially outer suspension part of said seal segment is axially offset from the median plane of said middle part thereof in the direction of the low-pressure side of said seal.

* * * * *